United States Patent
Kim et al.

(10) Patent No.: US 9,135,711 B2
(45) Date of Patent: Sep. 15, 2015

(54) VIDEO SEGMENTATION APPARATUS AND METHOD FOR CONTROLLING THE SAME

(71) Applicant: SAMSUNG ELECTRONICS CO., LTD., Suwon-si (KR)

(72) Inventors: Se-Hoon Kim, Suwon-si (KR); Young-Ho Moon, Suwon-si (KR); Soo-Chahn Lee, Seoul (KR); Han-Tak Kwak, Suwon-si (KR); Woo-Sung Shim, Suwon-si (KR); Ji-Hwan Woo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 14/041,214

(22) Filed: Sep. 30, 2013

(65) Prior Publication Data

US 2014/0093169 A1   Apr. 3, 2014

(30) Foreign Application Priority Data

Sep. 28, 2012 (KR) .................. 10-2012-0109378

(51) Int. Cl.
*G06K 9/34* (2006.01)
*G06T 7/00* (2006.01)

(52) U.S. Cl.
CPC ............. *G06T 7/0079* (2013.01); *G06T 7/0081* (2013.01); *G06T 7/0097* (2013.01); *G06T 2207/10016* (2013.01); *G06T 2207/20012* (2013.01); *G06T 2207/20076* (2013.01)

(58) Field of Classification Search
None
See application file for complete search history.

(56) References Cited

U.S. PATENT DOCUMENTS

| 7,783,106 | B2 | 8/2010 | Cooper et al. |
| 7,907,777 | B2 | 3/2011 | Aharon et al. |
| 2009/0016610 | A1* | 1/2009 | Ma et al. ..................... 382/195 |
| 2009/0297023 | A1 | 12/2009 | Lipton et al. |
| 2012/0002112 | A1* | 1/2012 | Huang et al. ................. 348/579 |
| 2012/0177121 | A1* | 7/2012 | Tripathi et al. .......... 375/240.16 |

* cited by examiner

Primary Examiner — Phuoc Tran
(74) Attorney, Agent, or Firm — Sughrue Mion, PLLC

(57) ABSTRACT

A method for controlling a video segmentation apparatus is provided. The method includes receiving an image corresponding to a frame of a video; estimating a motion of an object in the received image to be extracted from the received image, determining a plurality of positions of windows corresponding to the object; adjusting at least one of a size and a spacing of at least one window located at a position of the plurality of determined positions of the windows based on an image characteristic; and extracting the object from the received image based on the at least one window of which the at least one of the size and the spacing is adjusted.

14 Claims, 6 Drawing Sheets

VIDEO SEGMENTATION APPARATUS AND METHOD FOR CONTROLLING THE SAME

PRIORITY

This application claims priority from Korean Patent Application No. 10-2012-0109378, filed on Sep. 28, 2012, in the Korean Intellectual Property Office, the disclosure of which is incorporated herein in its entirety by reference.

BACKGROUND OF THE INVENTION

1. Field of the Invention

Methods and apparatuses consistent with exemplary embodiments relate to video segmentation, and more particularly, to a video segmentation apparatus for extracting a desired object from a video or from images of the video, using adaptive local windows, and a method for controlling the same.

2. Description of the Related Art

Video segmentation refers to a technology for classifying pixels, which are components of a video, and to finding boundaries of an object in the video to extract the object. For example, in order to find a shape and a size of a target object in the video, the video needs to be segmented into two regions: an object region and a background region. Objects play an important role in video analysis and representation. In particular, the Moving Picture Experts Group 4 (MPEG-4) Visual standard encodes videos on an object-by-object basis. These technologies are called object-based coding technologies. The object-based coding technology may reproduce or efficiently compress a video, using a variety of object editing techniques for combining, removing and transforming objects as needed.

An example of a video segmentation-based application is a weather forecast application which provides weather information by using a virtual screen like a weather chart as a background. Another example of a video segmentation application is a virtual studio which shows video of processed combined objects on different background screens. The key technology enabling these applications is the video segmentation technology that extracts only the desired object and combines it with a different background screen.

However, computer-assisted video segmentation processing is a difficult engineering problem because videos do not have clear boundaries and every video has different characteristics. The technology, which has been developed recently separates homogenous regions having similar characteristic values in the video based on image characteristics, such as luminance values, edge information and geometric information, combines regions having similar characteristics, and masks the video using all the combined regions.

Examples of the video segmentation algorithms developed up to the present may use a boundary processing technique, a region expansion technique, a segment integration technique, a watershed technique, and an edge-based technique. Each of these techniques has their own characteristics and applications.

However, the region expansion technique or the segment integration technique require high computational complexity and repetition to find out regions having the same characteristics by searching the entire video, and, these techniques have difficulties in extracting an object with the desired precision.

The watershed technique, an improved form of the region expansion technique, is a technique for gradually approaching the desired precision by repeating a process of simultaneously dividing a video into many regions and by re-combining these regions, using a plurality of seeds. However, the watershed technique also requires high computational complexity for the desired precision of the video segmentation, and may suffer from a fragmentation problem at the boundary of the video.

In summary, the video segmentation technologies developed up to now require high computational complexity to extract an object. In addition, these technologies suffer from fragmentation., i.e., a part of the object may be truncated or a part of an object may be included in another object unintentionally, and a contiguous boundary may not be found, making it difficult to accurately extract an object.

SUMMARY OF THE INVENTION

One or more exemplary embodiments provide a video segmentation apparatus configured to efficiently extract a desired object from a video, and a method for controlling the same.

One or more exemplary embodiments also provide a video segmentation apparatus configured to extract a desired object from a video using adaptive local windows, and a method for controlling the same.

According to an aspect of an exemplary embodiment, there is provided a method for controlling a video segmentation apparatus. The method includes receiving an image corresponding to a frame of a video; estimating a motion of an object to be extracted from the received image, determining a plurality of positions of windows corresponding to the object; adjusting at least one of a size and a spacing of at least one window located at a position of the plurality of determined positions of the windows based on an image characteristic; and extracting the object from the received image based on the at least one window of which the at least one of the size and the spacing is adjusted.

According to an aspect of another exemplary embodiment, there is provided a video segmentation apparatus including an image input unit configured to receive an image corresponding to a frame of a video; a motion estimator configured to estimate a motion of an object to be extracted from the received image, and to determine a plurality of positions of windows corresponding to the object; a local window adjuster configured to adjust at least one of a size and a spacing of at least one window located at a position of t the plurality of determined positions of the windows based on an image characteristic; and an object extractor configured to extract the object from the received image based on the at least one window of which the at least one of the size and the spacing is adjusted.

According to an aspect of another exemplary embodiment, there is provided a method for controlling a video segmentation apparatus. The method includes receiving an image corresponding to a frame of a video; determining at least one position of at least one window corresponding to an object to be extracted; adjusting a size of the at least one window based on a color characteristic and a motion characteristic of the at least one window using a quantized mapping function; calculating a probability value indicating whether pixels included in the adjusted at least one window correspond to the object based on an image characteristic; and extracting the object by separating the object from the image based on the probability value and an image edge characteristic.

According to an aspect of another exemplary embodiment, the image characteristic comprises a color of the object, a color distribution of the object, an image gradient distribution of the object, a motion identity of the object, and a shape of the object.

According to this aspect of the exemplary embodiment, the adjusting includes determining a motion of the object using the quantized mapping function and adjusting the size of the at least one window within a quantization range.

BRIEF DESCRIPTION OF THE DRAWINGS

The above and/or other aspects, features and advantages of certain exemplary embodiments will be more apparent certain exemplary embodiments in detail, with reference to the accompanying drawings, in which.

DETAILED DESCRIPTION OF EXEMPLARY EMBODIMENTS

Figure 1:
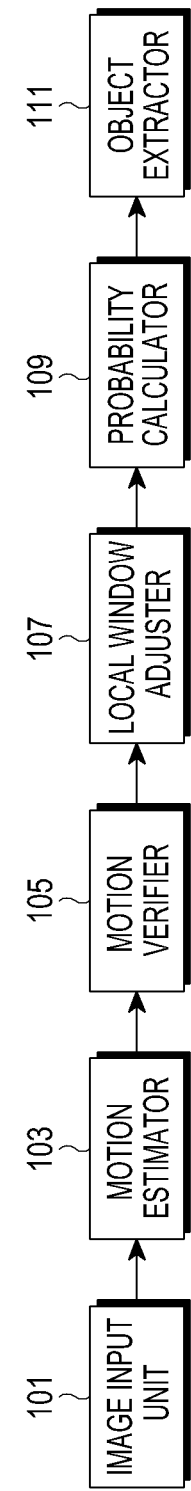
FIG. 1 is a view of a video segmentation apparatus according to an exemplary embodiment.

Exemplary embodiments are described in more detail with reference to the accompanying drawings, in which exemplary embodiments are shown. In the following description, same reference numerals are used for same elements when they are depicted in different drawings. In addition, specific details such as detailed configurations and components are merely provided to assist in a comprehensive understanding of exemplary embodiments. However, it is apparent to those skilled in the art that the exemplary embodiments described herein can be carried out without departing from the scope and spirit of the invention. In addition, descriptions of well-known functions and constructions are omitted for clarity and conciseness.

In an exemplary embodiment, an apparatus is provided for accurately extracting a desired object from an input video by adjusting at least one of a position, a size, and a spacing of local windows, based on image characteristics, and a method for controlling the same.

A video segmentation apparatus and a method for controlling the video segmentation apparatus according to an exemplary embodiment will now be described in detail.

FIG. 1 is a view of a video segmentation apparatus according to an exemplary embodiment.

Referring to FIG. 1, the video segmentation apparatus according to the exemplary embodiment includes an image input unit 101, a motion estimator 103, a motion verifier 105, a local window adjuster 107, a probability calculator 109, and an object extractor 111. The motion estimator 103 and the motion verifier 105 may be configured as a single unit, and the probability calculator 109 and the object extractor 110 may also be configured as a single unit.

The image input unit 101 receives, on a frame basis, images that are received over a network, and/or images that are generated by cameras or video production programs. It will be implemented by software or by hardware.

If the motion estimator 103 receives an image corresponding to a first frame of a specific video from the image input unit 101, the motion estimator 103 selects an object that a user desires to extract from the image corresponding to the first frame, and then determines positions of local windows corresponding to the selected object. And If the motion estimator 103 receives an image corresponding to a frame other than the first frame of the specific video from the image input unit 101, the motion estimator 103 determines positions of local windows corresponding to the selected object by estimating a motion of the selected object based on a difference between a motion of a previous input image and a motion of a current input image. The motion verifier 105 determines whether the determined positions of the local windows are match with at least one of a shape and a motion of the selected object, and verifies whether the determined positions of the local windows are correct. If it is verified that the determined positions of the local windows are correct, the motion verifier 105 transfers information about the determined positions of the local windows to the local window adjuster 107. If the determined positions of the local windows are incorrect, the motion verifier 105 transfers an indicator to the motion estimator 103 to re-determine the positions of the local windows. The indicator may include a distance by which the determined positions of local windows need to be shifted.

Based on the image characteristics, the local window adjuster 107 adjusts at least one of a size and a spacing of the local windows existing in the determined positions of the local windows. The image characteristics may include at least one of a motion strength (or a motion speed), a motion variation, a color variation, and a color confidence.

Figure 2:
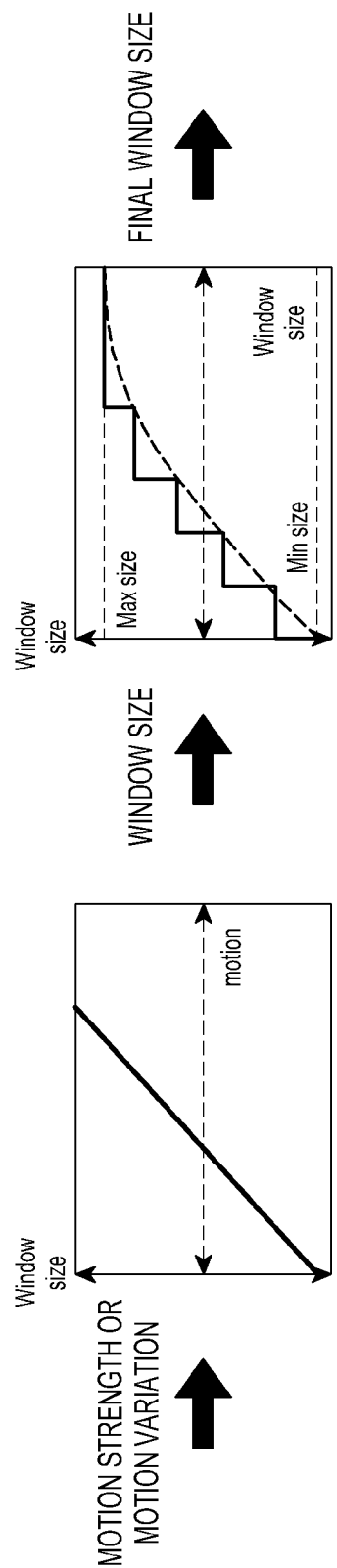
FIGS. 2A, 2B, 3A, 3B, and 3C illustrate operations performed in a local window adjuster in a video segmentation apparatus according to an exemplary embodiment.

In an exemplary embodiment, in order to extract a fast-moving object or a thin object, the local window adjuster 107 may adjust at least one of the size and the spacing of the local windows based on the motion variation. In other words, if the motion strength or the motion variation is large or significant, as illustrated in FIG. 2A, the local window adjuster 107 may step by step adjust the local window size to the maximum local windows size, as illustrated in FIG. 2B, thereby increasing the model robustness and the coverage.

In another exemplary embodiment, if the object and the background are similar in color, the local window adjuster 107 may adjust at least one of the size and the spacing of the local windows using a cost function that is based on the color confidence. In other words, the local window adjuster 107 may determine a local window size to maximize a color confidence using Equation (1) below. The color confidence is a value indicating the color distinction between an object and a background. The higher the color distinction, the higher the color confidence, whereas the lower the color distinction, the lower the color confidence.

$$S^* = \arg\max fc(s) \quad (1)$$

where $S^*$ denotes a determined local window size, s denotes a preset window size, and $fc(s)$ denotes a color confidence.

In another exemplary embodiment, if occlusion occurs, the local window adjuster 107 may adjust at least one of the size and the spacing of the local windows using a color variation and multiple references, in order to minimize an error. In other words, the local window adjuster 107 may determine a local window size to minimize the color variation of the local window using Equation (2) below.

$$S^* = \arg\min fv(s) \quad (2)$$

where $S^*$ denotes a determined local window size, s denotes a preset window size, and $fv(s)$ denotes a color variation.

Figure 3:
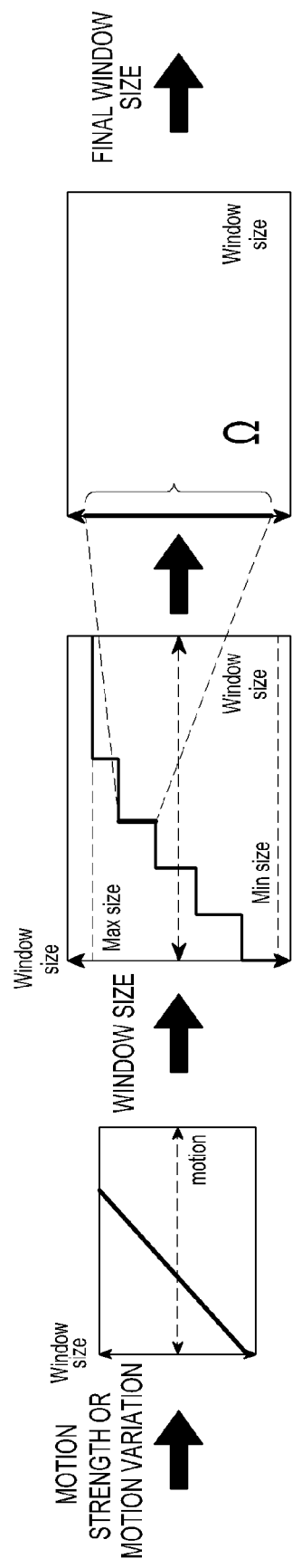

In another exemplary embodiment, the local window adjuster 107 may adjust a local window size using both motion and color characteristics of the local window, as illustrated in FIGS. 3A to 3C. In other words, as illustrated in FIGS. 3A to 3C, if the local window adjuster 107 receives information about the motion strength or the motion variation, as illustrated in FIG. 3A, the local window adjuster 107 may determine a motion-based local window size using a quantized mapping function, as illustrated in FIG. 3B, and may then finely adjust the local window size within a quantization range using Equation (1), as illustrated in FIG. 3C. The probability calculator 109 calculates a probability indicating whether each of the pixels (or sub-regions) of regions included in each of the adjusted local windows corresponds to the selected object. To calculate the probability, the probability calculator 109 uses at least one of an image characteristic. In an exemplary embodiment, the image characteristic may include a color of the object, a color distribution of the object, an image gradient distribution of the object, a motion identity of the object, and a shape of the object. To determine a probability value indicating whether each of the entire region of the input image corresponds to the selected object, probability values of regions included in the adjusted local window are calculated individually for each region. To determine a portion (or region) where the adjusted local windows overlap, probability values of the overlapping local windows are calculated by a weighted average technique. When region, which is located within the region surrounded by the adjusted local windows, is not included in the adjusted local windows, the region is filled with a value indicating that the region is highly likely to correspond to the selected object.

The object extractor 111 extracts an object by separating the selected object from the input image using the calculated total probability value and the image edge characteristics. The object separation technique may include a graph cut approach and a level set approach.

An operation of this video segmentation apparatus continues until an object is extracted from each of the images corresponding to all frames included in the video.

Figure 4:
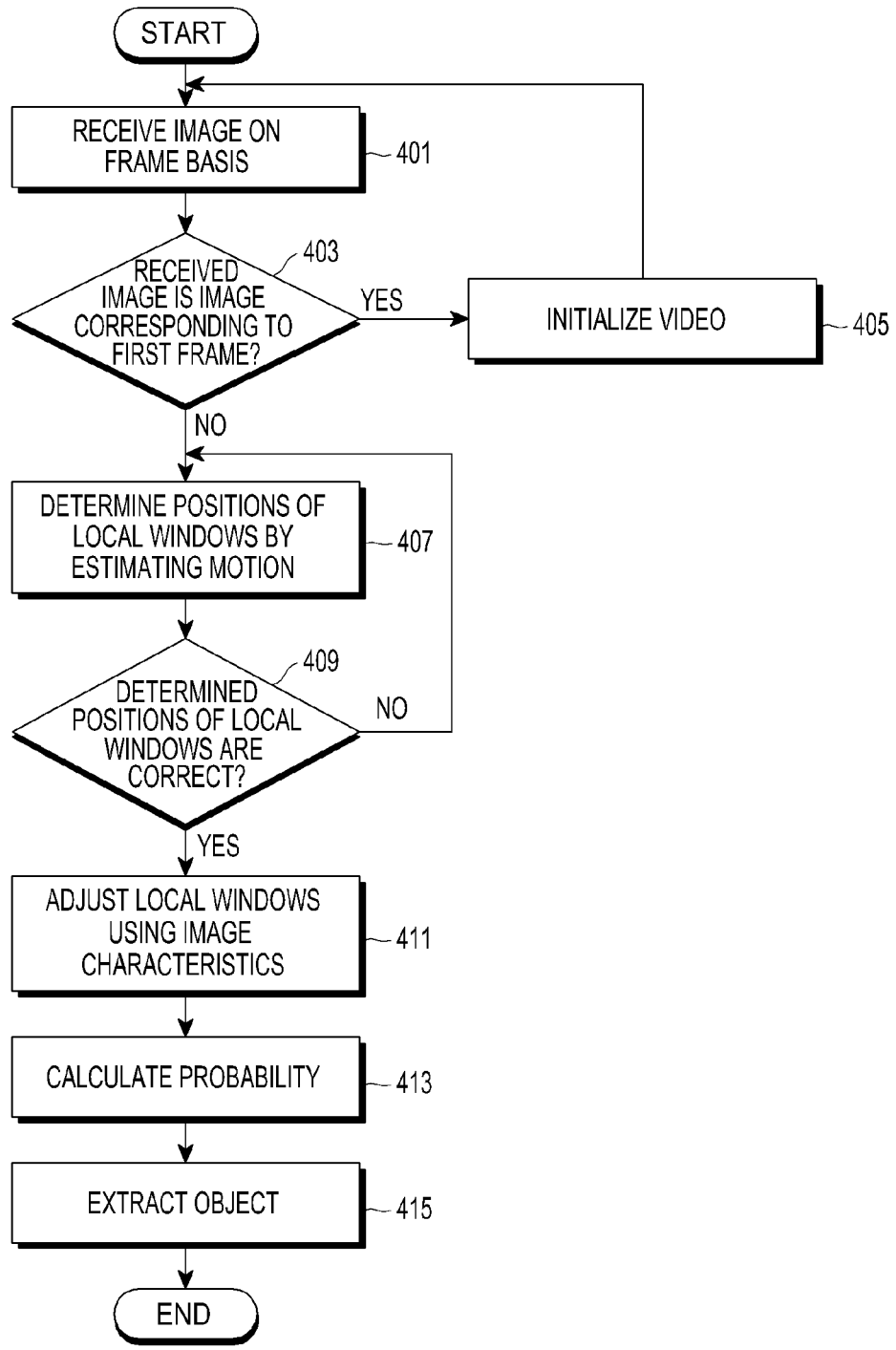
FIG. 4 is a flowchart of a method for controlling a video segmentation apparatus according to an exemplary embodiment.

FIG. 4 is a flowchart of a method for controlling a video segmentation apparatus according to an exemplary embodiment.

Referring to FIG. 4, in operation 401, the video segmentation apparatus receives images corresponding to first to last frames of a specific video on a frame basis. In operation 403, the video segmentation apparatus determines whether the received image is an image corresponding to the first frame. If the received image is an image corresponding to the first frame, the video segmentation apparatus proceeds to operation 405. If the received image is not an image corresponding to the first frame, the video segmentation apparatus proceeds to operation 407.

In operation 405, the video segmentation apparatus performs a video initialization process in which an object that a user desires to extract from the image corresponding to the first frame is selected, and in which positions and sizes of local windows are determined to extract the selected object.

In operation 407, the video segmentation apparatus determines positions of local windows corresponding to the selected object by estimating a motion of the selected object based on a difference between the previous input image and the current input image. In operation 409, the video segmentation apparatus verifies whether the determined positions of local windows are correct by determining whether the determined positions of local windows match with at least one of a shape and a motion of the selected object. If it is verified that the determined positions of local windows are correct, the video segmentation apparatus proceeds to operation 411. If the determined positions of local windows are incorrect, the video segmentation apparatus returns to operation 407.

In operation 411, the video segmentation apparatus adjusts at least one of a size and a spacing of the local windows located in the determined positions of local windows, using the image characteristics. The image characteristics may include at least one of a motion strength, a motion variation, a color variation, and a color confidence.

The process, performed in operation 411, of adjusting at least one of the size and the spacing of local windows is performed by the local window adjuster 107 of the video segmentation apparatus. As described above, the local window adjuster 107 may operate as follows.

In an exemplary embodiment, in order to extract a fast-moving object or a thin object, the local window adjuster 107 may adjust at least one of the size and the spacing of the local windows based on the motion variation. In other words, if the motion strength or the motion variation is large or significant, as illustrated in FIG. 2A, the local window adjuster 107 may step by step adjust the local window size to the maximum size, as illustrated in FIG. 2B, thereby increasing the model robustness and the coverage.

In another exemplary embodiment, if the object and the background are similar in color, the local window adjuster 107 may adjust at least one of the size and the spacing of the local windows using a cost function that is based on a color confidence. In other words, the local window adjuster 107 may determine a local window size to maximize a color confidence using Equation (1).

In another exemplary embodiment, if occlusion occurs, the local window adjuster 107 may adjust at least one of a size and a spacing of the local windows using the color variation and multiple references, in order to minimize an error. In other words, the local window adjuster 107 may determine a local window size to minimize the color variation using Equation (2).

In another exemplary embodiment, the local window adjuster 107 may adjust a local window size using both the motion and the color characteristics, as illustrated in FIGS. 3A to 3C. In other words, as illustrated in FIGS. 3A to 3C, if the local window adjuster 107 receives information about the motion strength or the motion variation as illustrated in FIG. 3A, the local window adjuster 107 may determine a motion-based local window size using a quantized mapping function, as illustrated in FIG. 3B, and may then finely adjust the local window size within a quantization range, as illustrated in FIG. 3C, using Equation (1).

Referring back to FIG. 4, in operation 413, the video segmentation apparatus calculates a probability value indicating whether each of pixels of regions included in each of the adjusted local windows corresponds to the selected object, and calculates the probability values for each of the adjusted local windows. Thereafter, in operation 415, the video segmentation apparatus extracts an object corresponding to the calculated probability value from the input image, thereby extracting a desired object.

Figure 5:
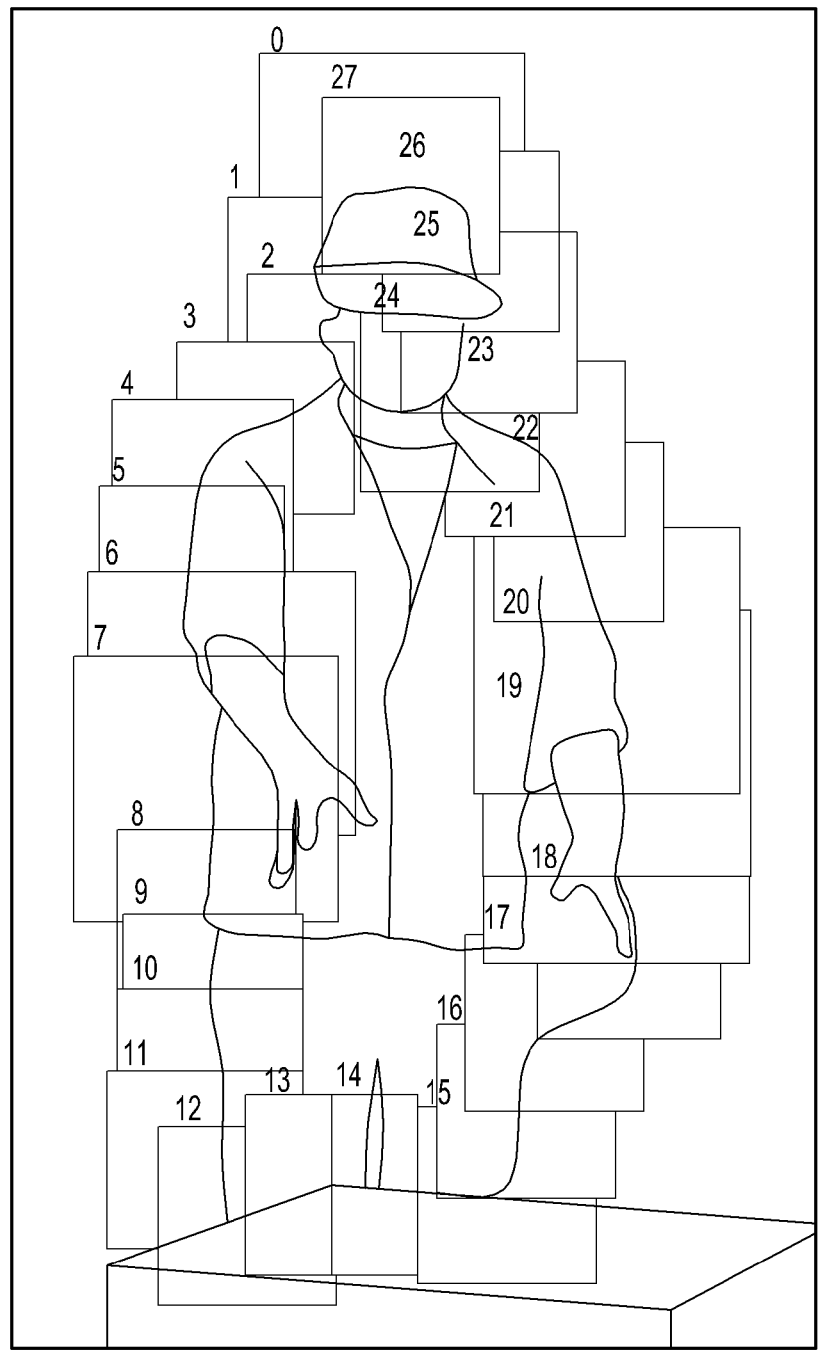
FIG. 5 is a view illustrating local windows adjusted for an object selected from an input video according to an exemplary embodiment.
Figure 6A:
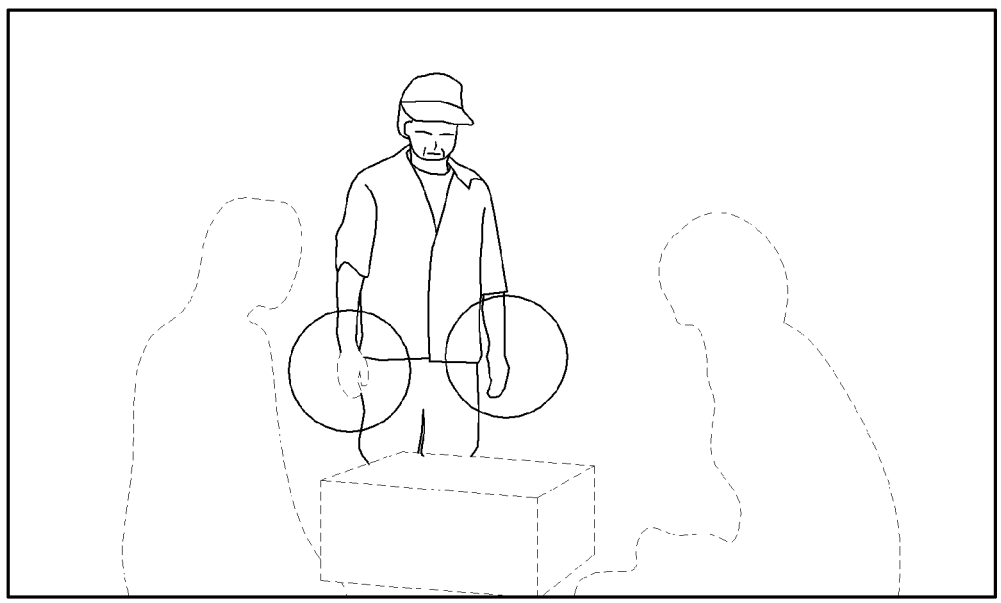
FIGS. 6A and 6B are views illustrating comparisons between a control method of a conventional video segmentation apparatus and a control method of a video segmentation apparatus according to an exemplary embodiment.
Figure 6B:
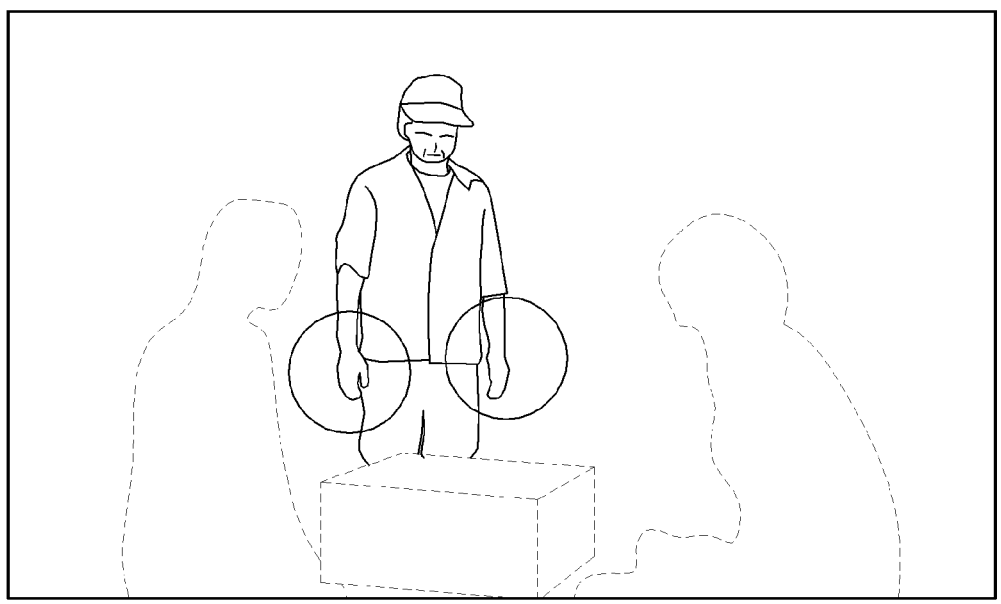

FIGS. 5, 6A and 6B are views illustrating possible effects that can be obtained when a video is segmented according to an exemplary embodiment of the present invention. FIG. 5 is a view illustrating local windows adjusted for an object selected from an input video according to an exemplary embodiment, and FIGS. 6A and 6B are views illustrating comparisons between a control method of a conventional video segmentation apparatus and a control method of a video segmentation apparatus according to an exemplary embodiment.

As shown in FIG. 5, the control method for the video segmentation apparatus according to an exemplary embodiment may determine positions of local windows corresponding to a desired object, and may adjust at least one of a size and a spacing of local windows existing in the determined positions of local windows using the image characteristics to display all of the local windows on the desired object.

As shown in FIGS. 6A and 6B, when performing video segmentation (FIG. 6B) using local windows which are adjusted according to an exemplary embodiment, the video segmentation apparatus may efficiently extract a desired object, compared to the performing of the video segmentation (as illustrated in FIG. 6A) using the conventional fixed local windows.

The foregoing exemplary embodiments and advantages are merely exemplary and are not to be construed as limiting the present inventive concept. The description of the exemplary embodiments is intended to be illustrative, and not to limit the scope of the claims, an many alternatives, modifications, and variations will be apparent to those skilled in the art.

What is claimed is:

1. A method for controlling a video segmentation apparatus, comprising:
    receiving an image corresponding to a frame of a video;
    estimating a motion of an object to be extracted from the received image;
    determining a plurality of positions of windows corresponding to the object;
    adjusting at least one of a size and a spacing of at least one window located at a position of the plurality of determined positions of the windows based on an image characteristic; and
    extracting the object from the received image, based on the at least one window of which the at least one of the size and the spacing is adjusted.

2. The method of claim 1, wherein the image characteristic comprises at least one of a motion strength, a motion variation, a color variation, and a color confidence.

3. The method of claim 1, wherein the determining comprises:
    if the received image is not an image corresponding to a first frame, estimating a motion of the object based on difference between a motion of an image corresponding to a previous frame and a motion of the received image to determine the plurality of the positions of the windows corresponding to the object; and
    adjusting the plurality of the determined positions of the windows depending on whether the plurality of the determined positions of the windows match with at least one of a shape and a motion of the object.

4. The method of claim 1, wherein the extracting comprises:
    calculating a probability value indicating whether each pixel of regions included in the at least one window of which the at least one of the size and the spacing is adjusted, corresponds to the object;
    calculating a probability value for the at least one window of which the at least one of the size and the spacing is adjusted; and
    extracting the object corresponding to the calculated value from the received image.

5. A video segmentation apparatus comprising:
    an image input unit configured to receive an image corresponding to a frame of a video;
    a motion estimator configured to estimate a motion of an object to be extracted from the received image, and to determine a plurality of positions of windows corresponding to the object;
    a local window adjuster configured to adjust at least one of a size and a spacing of at least one window located at a position of the plurality of determined positions of the windows based on an image characteristic; and
    an object extractor configured to extract the object from the received image based on the at least one window of which the at least one of the size and the spacing is adjusted.

6. The video segmentation apparatus of claim 5, wherein the image characteristic comprises at least one of a motion strength, a motion variation, a color variation, and a color confidence.

7. The video segmentation apparatus of claim 5, wherein if the received image is not an image corresponding to a first frame, the motion estimator estimates a motion of the object based on difference between a motion of an image corresponding to a previous frame and a motion of the received image to determine the plurality of the positions of the windows corresponding to the object; and
    wherein the motion estimator adjusts the plurality of the determined positions of the windows depending on whether the plurality of the determined positions of the windows match with at least one of a shape and a motion of the object.

8. The video segmentation apparatus of claim 5, wherein the object extractor calculates a probability value indicating whether each pixel of regions included in the at least one window of which the at least one of the size and the spacing is adjusted, corresponds to the object, calculates a probability value for the at least one window of which the at least one of the size and the spacing is adjusted, and extracts the object corresponding to the calculated value from the received image.

9. A method for controlling a video segmentation apparatus, comprising:
    receiving an image corresponding to a frame of a video;
    determining at least one position of at least one window corresponding to an object to be extracted;
    adjusting a size of the at least one window based on a color characteristic and a motion characteristic of the at least one window using a quantized mapping function;
    calculating a probability value indicating whether pixels included in the adjusted at least one window correspond to the object based on an image characteristic; and
    extracting the object by separating the object from the image based on the probability value and an image edge characteristic.

10. The method of claim 9, wherein the image characteristic comprises a color of the object, a color distribution of the object, an image gradient distribution of the object, a motion identity of the object, and a shape of the object.

11. The method of claim 9, wherein the adjusting comprises:
    determining a motion of the object using the quantized mapping function; and
    adjusting the size of the at least one window within a quantization range.

12. A video segmentation apparatus comprising: an image input unit configured to receive an image corresponding to a frame of a video;
    a motion estimator configured to determine at least one position of at least one window corresponding to an object to be extracted;

a local window adjuster configured to adjust a size of the at least one window based on a color characteristic and a motion characteristic of the at least one window using a quantized mapping function;

a probability calculator configured to calculate a probability value indicating whether pixels included in the adjusted at least one window correspond to the object based on an image characteristic; and an object extractor configured to extract the object by separating the object from the image based on the probability value and an image edge characteristic.

13. The video segmentation apparatus of claim 12, wherein the image characteristic comprises a color of the object, a color distribution of the object, an image gradient distribution of the object, a motion identity of the object, and a shape of the object.

14. The video segmentation apparatus of claim 12, wherein the local window adjustor is configured to:

determine a motion of the object using the quantized mapping function; and adjust the size of the at least one window within a quantization range.

\* \* \* \* \*